United States Patent
Nakajo et al.

(10) Patent No.: US 10,235,785 B2
(45) Date of Patent: Mar. 19, 2019

(54) IMAGE COMPOSITING DEVICE BASED ON MASK IMAGE, IMAGE COMPOSITING METHOD BASED ON MASK IMAGE, AND NON-TRANSITORY COMPUTER-READABLE RECORDING MEDIUM THEREFOR

(71) Applicant: LIVE2D INC., Tokyo (JP)

(72) Inventors: Tetsuya Nakajo, Tokyo (JP); Masayuki Todate, Tokyo (JP)

(73) Assignee: LIVE2D INC., Tokyo (JP)

( * ) Notice: Subject to any disclaimer, the term of this patent is extended or adjusted under 35 U.S.C. 154(b) by 55 days.

(21) Appl. No.: 15/123,551

(22) PCT Filed: Oct. 27, 2014

(86) PCT No.: PCT/JP2014/078506
§ 371 (c)(1),
(2) Date: Sep. 2, 2016

(87) PCT Pub. No.: WO2015/141049
PCT Pub. Date: Sep. 24, 2015

(65) Prior Publication Data
US 2017/0076476 A1 Mar. 16, 2017

(30) Foreign Application Priority Data
Mar. 18, 2014 (JP) .................. 2014-055087

(51) Int. Cl.
*G06T 1/00* (2006.01)
*G06T 11/60* (2006.01)
(Continued)

(52) U.S. Cl.
CPC ............ *G06T 11/60* (2013.01); *G06T 1/0007* (2013.01); *G06T 15/503* (2013.01); *H04N 1/387* (2013.01);
(Continued)

(58) Field of Classification Search
None
See application file for complete search history.

(56) References Cited

U.S. PATENT DOCUMENTS

| 2001/0019333 A1 | 9/2001 | Sasaki |
| 2008/0084429 A1 | 4/2008 | Wissinger |

(Continued)

FOREIGN PATENT DOCUMENTS

| CA | 2774114 A1 | 4/2011 |
| CN | 101432489 A | 5/2009 |

(Continued)

OTHER PUBLICATIONS

Shinya, Permeanent file!, 64 pages for thorough master of new Shade, All mankind Shade R5 plan, Learn from 12 people!, R5 ultimate technique, Make a cool woman using "Skin"! WinGraphic No. 27, Japan, MdN Corporation, Aug. 1, 2001, No. 27, pp. 51-55.

(Continued)

*Primary Examiner* — Idowu O Osifade
(74) *Attorney, Agent, or Firm* — Enshan Hong; VLP Law Group LLP

(57) ABSTRACT

A storage (240) of an image processing device (100) stores a background image (2410) and a first image (2420) and a second image (2430) that are foreground images with respect to the background image (2410), and a first basic mask image (the first basic mask image (2450) formed from pixels having a pixel value of '1' indicating opacity and pixels having a pixel value of '0' indicating transparence. An acquirer (250) acquires each of these images. An image generator (220) generates a first intermediate image by compositing the first image (2420) onto the background image (2410) only in pixels that are in the same positions as the pixels in the first basic mask image (2450) having the pixel value of '1'. The image generator (220) then generates a first composite image by overwriting the second image (Continued)

(2430) onto the first intermediate image only in the pixels that are in the same positions as the pixels in the first basic mask image (2450) having the pixel value of '1'.

10 Claims, 17 Drawing Sheets

(51) Int. Cl.
  *G06T 15/50* (2011.01)
  *H04N 1/387* (2006.01)
(52) U.S. Cl.
  CPC *G06T 2207/20221* (2013.01); *G06T 2210/62* (2013.01)

(56) References Cited

U.S. PATENT DOCUMENTS

| | | | |
|---|---|---|---|
| 2010/0024318 A1 | 2/2010 | Zhang | |
| 2013/0016902 A1* | 1/2013 | Suino | G06K 15/189 382/164 |
| 2015/0002545 A1* | 1/2015 | Webster | G09G 5/377 345/634 |
| 2015/0056042 A1 | 2/2015 | Marxkors | |

FOREIGN PATENT DOCUMENTS

| | | | |
|---|---|---|---|
| CN | 101989348 A | 3/2011 |
| CN | 102208102 A | 10/2011 |
| JP | H01217681 A | 8/1989 |
| JP | H06178777 A | 6/1994 |
| JP | H0994348 A | 4/1997 |
| JP | H09190459 A | 7/1997 |
| JP | H1074270 A | 3/1998 |
| JP | 2001-209814 A | 8/2001 |
| JP | 2001209824 A | 8/2001 |
| JP | 2001245320 A | 9/2001 |
| JP | 2001356756 A | 12/2001 |
| JP | 2003085591 A | 3/2003 |
| JP | 2005-122479 A | 5/2005 |
| JP | 2008235989 A | 10/2008 |
| JP | 2009104570 A | 5/2009 |
| JP | 4776831 B2 | 9/2011 |
| JP | 5610327 B | 10/2014 |

OTHER PUBLICATIONS

Notice of Reasons for Rejection dated Feb. 4, 2014 by the Japanese Patent Office for the Japan Related Application No. 2013-249602.
Office Action issued by Korean Patent Office dated Jan. 6, 2017, in connection with related Korean Patent Application No. 10-2016-7015627.
Office Action dated Jul. 19, 2017 for related Canadian Application No. 2943108 by Canadian Intellectual Property Office.
Office Action dated Mar. 20, 2017 for related Canadian Application No. 2932157 by Canadian Intellectual Property Office.
Office Action dated Oct. 17, 2017 for related U.S. Appl. No. 15/039,705.
Office Action dated May 3, 2018 for related China Application No. 201480077260.7.
Office Action dated Jun. 1, 2018 for related China Application No. 201480066053.1.

* cited by examiner

BACKGROUND IMAGE 2410

BODY(FIRST IMAGE)
2420

CLOTHING (SECOND IMAGE) 2430

BODY(THIRD IMAGE)

BODY(FOURTH IMAGE)

BITMAP PATTERN OF
FIRST BASIC MASK IMAGE

BITMAP PATTERN OF
SECOND BASIC MASK IMAGE

BITMAP PATTERN OF
REVERSE BASIC MASK IMAGE

BITMAP PATTERN OF
THIRD BASIC MASK IMAGE

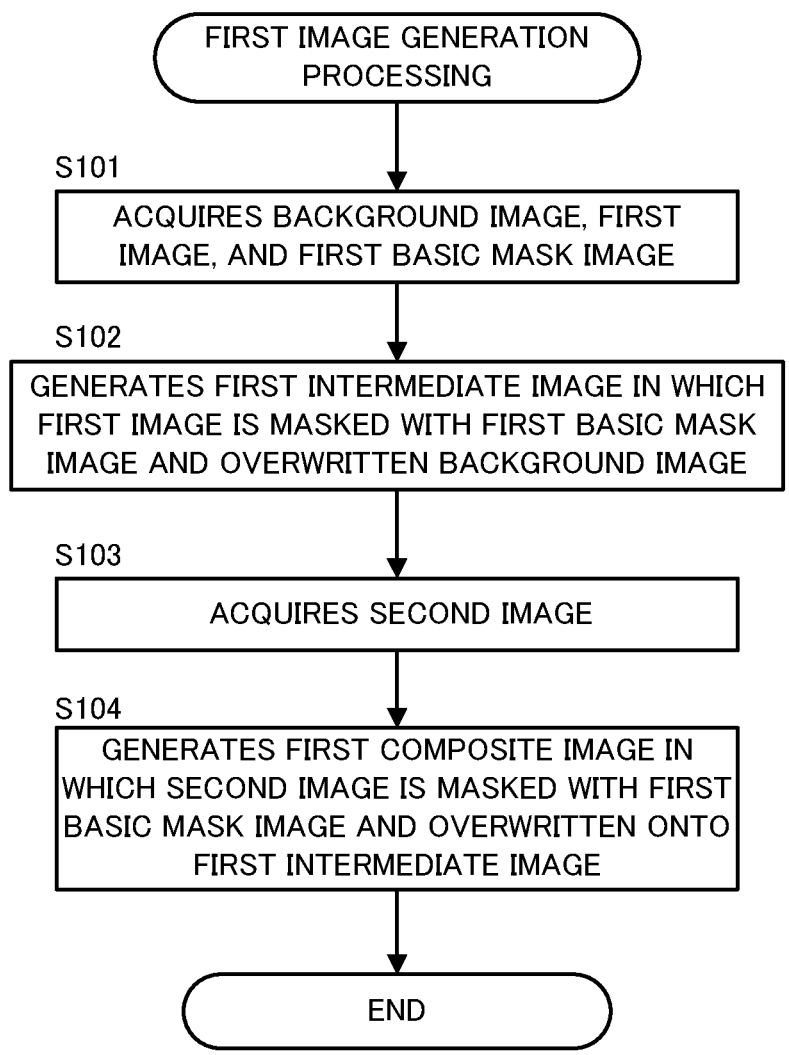

FIRST INTERMEDIATE IMAGE 2480

FIRST COMPOSITE IMAGE 2490 understand# IMAGE COMPOSITING DEVICE BASED ON MASK IMAGE, IMAGE COMPOSITING METHOD BASED ON MASK IMAGE, AND NON-TRANSITORY COMPUTER-READABLE RECORDING MEDIUM THEREFOR

PRIORITY CLAIM

This is a U.S. national stage of application No. PCT/JP2014/078506, filed on Oct. 27, 2014. Priority is claimed on the following applications: Country: Japan, Application No.: 2014-055087, Filed: Mar. 18, 2014), the content of which is incorporated here by reference

TECHNICAL FIELD

The present disclosure relates to an image processing device, an image processing method, and a program.

BACKGROUND ART

Alpha blending processing whereby two images are composited together based on opacity degree of each of the pixels in each of the images is a known image processing technique (Refer to Patent Literature 1.). By using alpha blending processing to composite the foreground image onto a background image, an image can be created that makes the foreground image semi-transparent with respect to the background image.

When, for example, an image of an anime character (two-dimensional model) is a foreground image, alpha blending processing is used for fading in the character. When the character image is made semi-transparent with respect to a background image, the character image is composited onto the background image based on the opacity degree of the entire image of the character with respect to the background image.

When the character is wearing clothing, the character image is often an image in which an image of clothing is composited with an image of a body. Here, to display the semi-transparent image of the character, the image of the body is made semi-transparent and is composited onto the background image by using the alpha blending processing. Next, the image of the clothing in the foreground of image of the body is made semi-transparent and is composited. In such a case however, a semi-transparent image is generated in which the body that should be hidden shows through the clothing instead.

To prevent the body from showing through, first, the image of the body is overwritten with the image of the clothing and a semi-transparent character image is generated. Next, the generated character image is composited onto the background image through alpha blending processing.

CITATION LIST

Patent Literature

Patent Literature 1: Unexamined Japanese Patent Application Kokai Publication No. 2005-122479

SUMMARY OF INVENTION

Technical Problem

However, in the above-described method for preventing the body from showing through, after the composite image of the clothing image and the body image is generated, the composite image must then be composited onto the background image. Therefore, the processing load caused by composition processing is high. Likewise, the storage capacity required for storing composite images also increases. Besides clothing and body images, the same problem also occurs when a semi-transparent image containing a deeply positioned first image and a second image positioned in front of the first image that are in a same location, is composited onto a background image.

The present disclosure is made to solve the problems described above, and an objective of the present disclosure is to provide an image processing device, an image processing method, and a program that enable easy generation of an image in which a first image and a second image are semi-transparent with respect to a background image without the first image showing through the second image.

Solution to Problem

To achieve the above-mentioned objective, the image processing device includes:

storage means for storing a background image, a first image and a second image that are foreground images with respect to the background image and have predetermined positions relative to the background image, and a first mask image formed from pixels having a first pixel value indicating opacity and pixels having a zero pixel value indicating transparence;

acquisition means for acquiring the background image, the first image, the second image, and the first mask image from the storage means; and image generation means for generating a first composite image in which the second image acquired by the acquisition means is composited, onto the background image acquired by the acquisition means, in the pixels that are in the same positions as the pixels in the first mask image having the first pixel value, and the first image acquired by the acquisition means is composited, onto the background image acquired by the acquisition means, where the second image is not composited, in the pixels that are in the same positions as the pixels in the first mask image having the first pixel value.

Advantageous Effects of Invention

According to the present disclosure, an image may be generated in which a first image and a second image are semi-transparent with respect to a background image without the first image showing through the second image.

BRIEF DESCRIPTION OF DRAWINGS

FIG. 9 is a flowchart illustrating a flow of first image generation processing according to the embodiment of the present disclosure;

DESCRIPTION OF EMBODIMENTS

Hereinafter, the image processing device in the embodiment of the present disclosure is described below with reference to FIG. 1.

Figure 1:
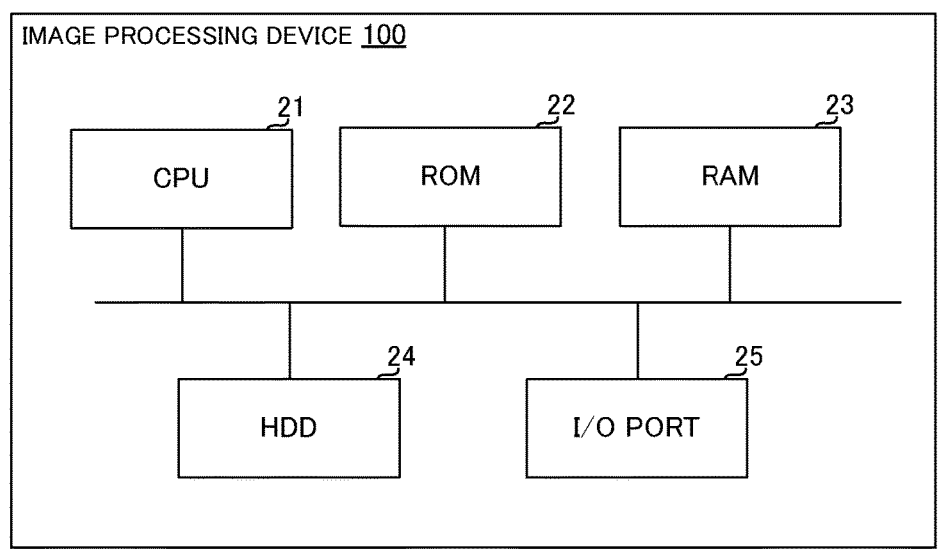
FIG. 1 is a block diagram illustrating a hardware configuration of an image processing device according to an embodiment of the present disclosure.

An image processing device 100 as illustrated in FIG. 1 includes a CPU 21, a ROM 22, a RAM 23, a HDD 24, and an I/O port 25.

The CPU 21 is a central processing device for controlling the whole of the image processing device 100.

The ROM 22 is non-volatile memory that stores programs that are executed by the CPU 21.

The RAM 23 is volatile memory that temporarily holds the programs that are executed by the CPU 21, and is used as a work area when the CPU 21 executes various kinds of processing.

The hard disk drive (HDD) 24 is large-capacity, non-volatile memory for storing various data such as images.

The I/O port 25 is an interface for connecting and inputter 10 such as a keyboard and/or a mouse (Refer to FIG. 2.) a display 30 such as a monitor display (Refer to FIG. 2.) and/or the image processing device 100.

Here the CPU 21 reads the various programs in the ROM 22 and temporarily places the programs in the RAM 23. Then the CPU 21 controls the image processing device 100 in accordance with the various programs, and thus realizes the function of each component as illustrated in FIG. 2.

Figure 2:
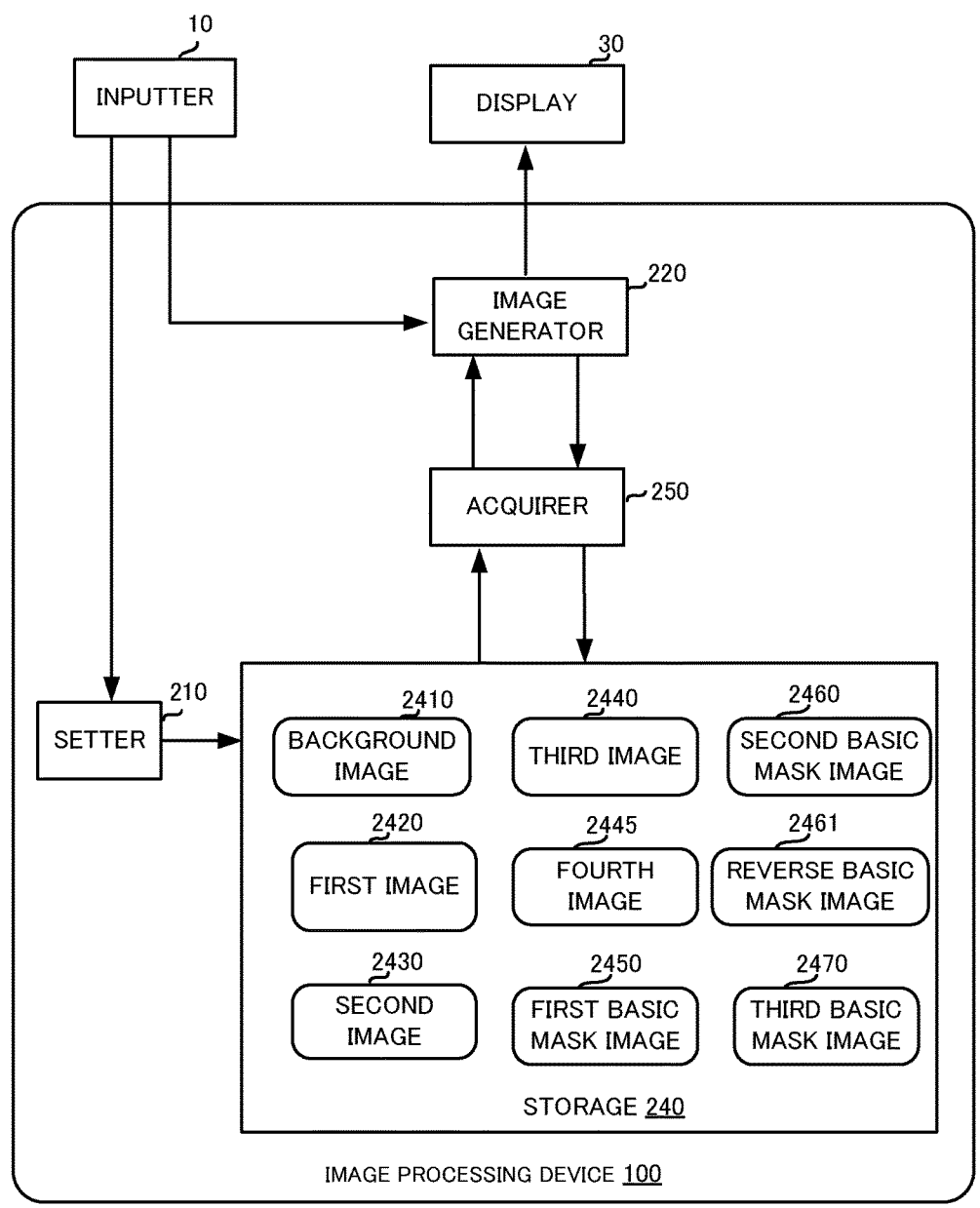
FIG. 2 is a function block diagram of the image processing device according to the embodiment of the present disclosure.

The image processing device 100 as illustrated in FIG. 2 functionally includes a setter 210, an image generator 220, a storage 240, and an acquirer 250. The inputter 10 and the display 30 are connected to the image processing device 100.

The inputter 10 is, for example, a keyboard and/or a mouse. The inputter 10 receives a user operation and outputs the received information to the setter 210 or the image generator 220.

The display 30 is a monitor display or the like. The display 30 displays images.

Figure 3A:
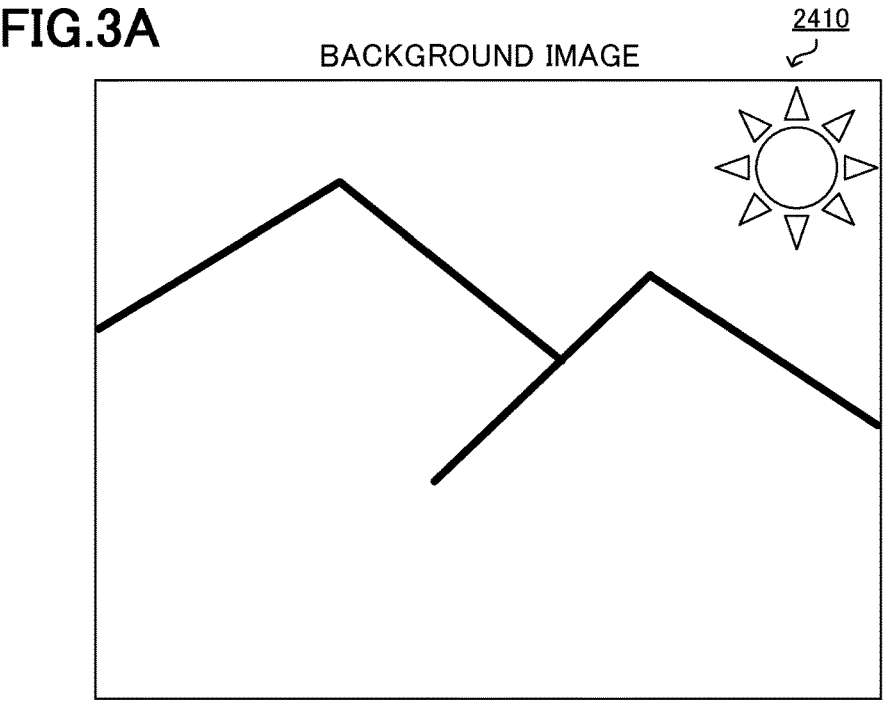
FIG. 3A is a diagram illustrating a background image according to the embodiment of the present disclosure.
Figure 3B:
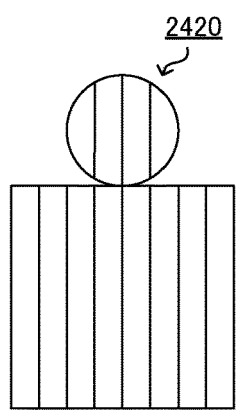
FIG. 3B is a diagram illustrating a first image according to the embodiment of the present disclosure.
Figure 3C:
FIG. 3C is a diagram illustrating a second image according to the embodiment of the present disclosure.
Figure 3D:
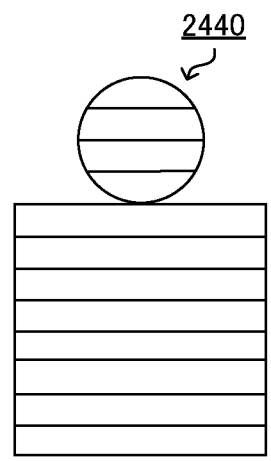
FIG. 3D is a diagram illustrating a third image according to the embodiment of the present disclosure.
Figure 3E:
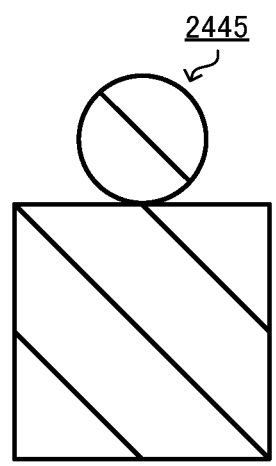
FIG. 3E is a diagram illustrating a fourth image according to the embodiment of the present disclosure.

The storage 240 is constituted by the HDD 24. The storage 240 stores images such as images for treatment processing and treated images. Images for treatment processing are optional. In the present disclosure, for ease of understanding, a background image 2410 illustrated in FIG. 3A, a first image 2420 illustrated in FIG. 3B, a second image 2430 illustrated in FIG. 3C, a third image 2440 illustrated in FIG. 3D, and a fourth image 2445 illustrated in FIG. 3E are stored.

The background image 2410 is an image that is placed furthest in the background. The first image 2420, the third image 2440, and the fourth image 2445 are images of bodies of people positioned in front of the background image 2410. The second image 2430 is an image of clothing positioned in front of the first image 2420. Below, the first image is sometimes simply referred to as a first person. This same naming convention is used for the second image through the fourth image.

The relative positions of the background image 2410, the first image 2420, the second image 2430, the third image 2440, and the fourth image 2445 are predetermined. Also, information regarding the relative positions is stored in the storage 240.

Figure 4:
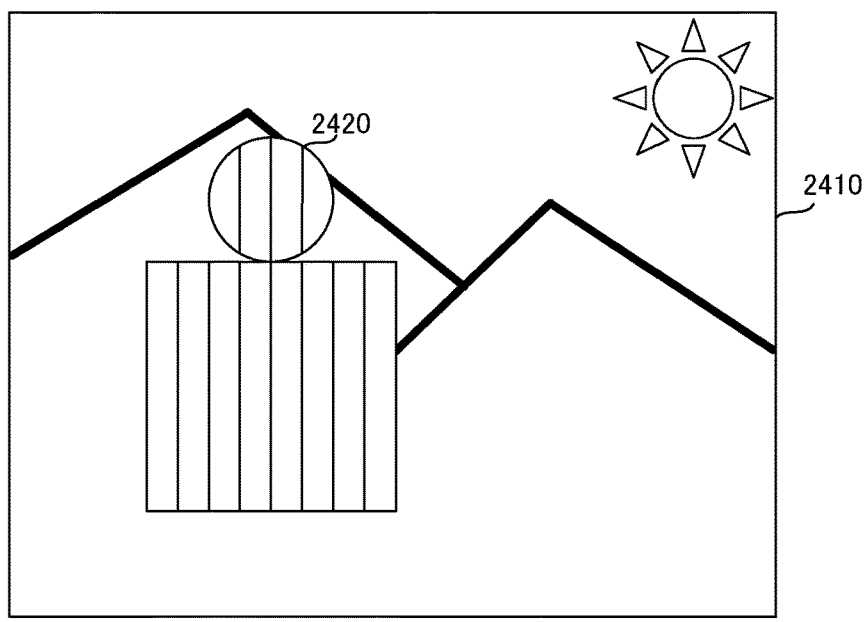
FIG. 4 is a diagram illustrating a relative positional relationship between the background image and the first image according to the embodiment of the present disclosure.

Specifically, as in an image 2446 of FIG. 4, which indicates the relative position between the background image and the first image, the first (first person) image 2420 is placed in a specific relative position in front of the background image 2410.

Figure 5:
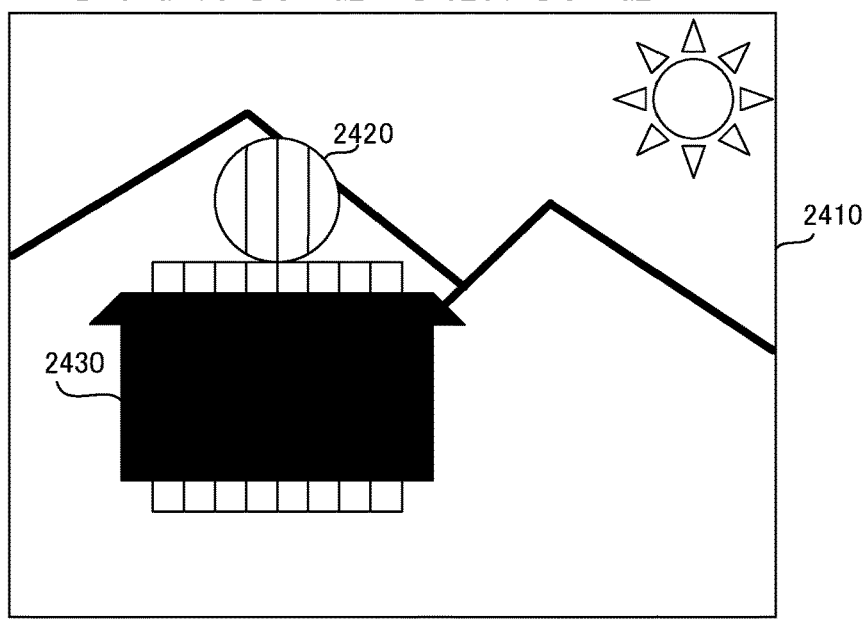
FIG. 5 is a diagram illustrating a relative positional relationship between the background image and the second image according to the embodiment of the present disclosure.

The second image 2430 is an image of clothing of the person in the first image 2420. As in an image 2447 of FIG. 5, which indicates the relative position between the background image and the second image, the second image 2430 (clothing image) is placed in front of the first image 2420.

Figure 6:
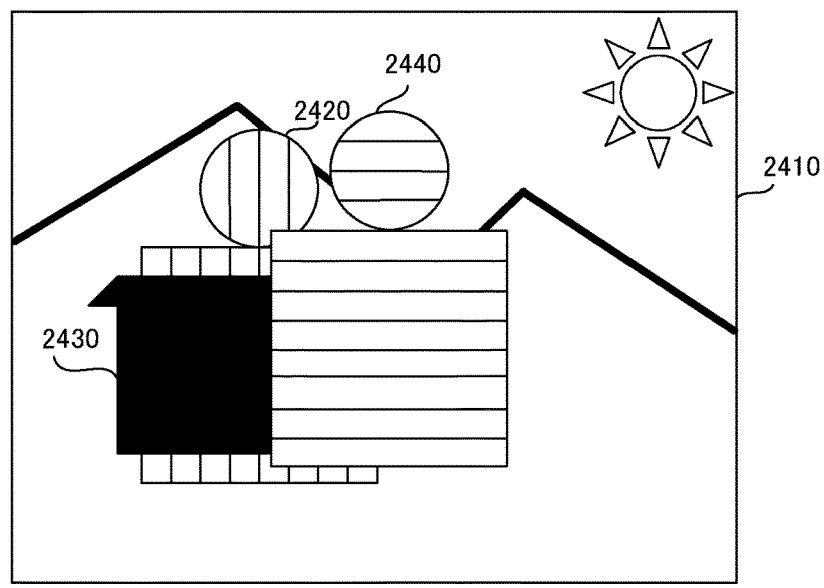
FIG. 6 is a diagram illustrating a relative positional relationship between the background image and the third image according to the embodiment of the present disclosure.

The third image 2440 is an image of a person who is different from the person in the first image 2420. As in an image 2448 of FIG. 6, which indicates the relative position between the background image and the third image, the third image 2440 is placed in front of and slightly to the right of the first image 2420.

Figure 7:
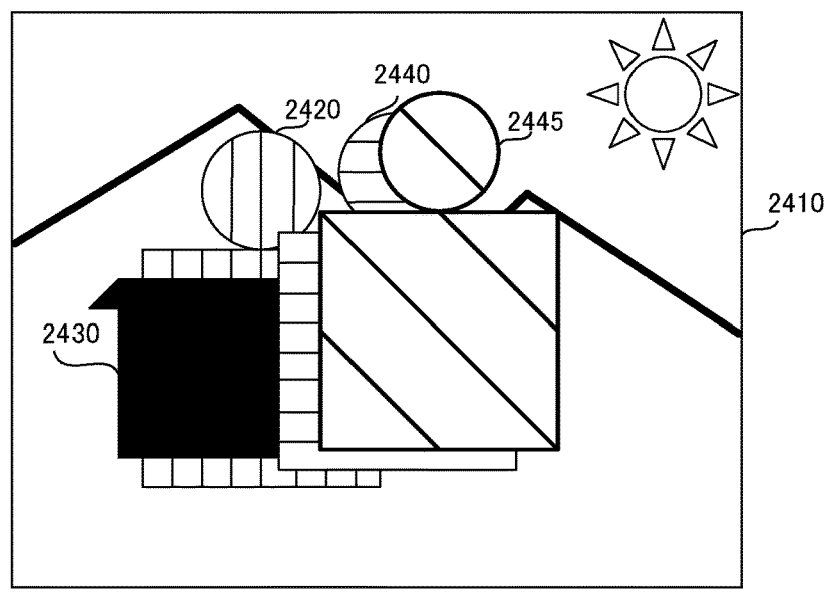
FIG. 7 is a diagram illustrating a relative positional relationship between the background image and the fourth image according to the embodiment of the present disclosure.

The fourth image 2445 is an image of a person who is different from the person in the first image 2420 and the person in the second image 2430. As in an image 2449 of FIG. 7, which indicates the relative position between the background image and the fourth image, the fourth image 2445 is placed in front of and slightly to the right of the third image 2440. The first image 2420, the second image 2430, the third image 2440, and the fourth image 2445 are hereinafter collectively referred to as a foreground image when the individual images need not be distinguished from each other.

Also, the storage 240 stores a first basic mask image 2450, a second basic mask image 2460, a reverse basic mask image 2461, and a third basic mask image 2470, as basic mask images for generating semi-transparent images.

The first basic mask image 2450, the second basic mask image 2460, the reverse basic mask image 2461, and the third basic mask image 2470 stored by the storage 240 are binary images made up of pixels with a first pixel value indicating opacity and a zero pixel value indicating transparence.

In the present embodiment, in semi-transparent processing, the portion being not transparent through a pixel of a foreground has the first pixel value indicating opacity, whereas the portion that allows transmission through a pixel of a foreground has the zero pixel value indicating transparence. In other words, this means that the portion with the first pixel value does not mask the image to be composited (the color of the image to be composited is applied on the foreground image), whereas the portion with the zero pixel value masks the image to be composited (the color of the image to be composited is not applied on the foreground image). In the former, since the color of the image to be composited is applied on the foreground image, the color of the foreground image does not show through. In the latter, since the color of the image to be composited is not applied on the foreground image, the color of the foreground shows through.

In the explanation provided below, for ease of understanding, the first pixel value is referred to as '1' and the zero pixel value is referred to as '0'. Also, the proportion of pixels having a pixel value of '1' with respect to all of the pixels of the basic mask image is referred to as the opacity degree of the mask image. Thus, the lower the proportion of pixels having a pixel value of '1' (the greater the proportion of pixels have a pixel value of '0') is, the more transparent the image to be composited with the foreground becomes due to masking and due to the color not being applied to the foreground image. Therefore, the opacity degree of the image to be composited decreases (the transparency degree increases).

The first basic mask image 2450, the second basic mask image 2460, the reverse basic mask image 2461, and the third basic mask image 2470 each have a bitmap pattern respectively illustrated in FIGS. 8A, 8B, 8C, and 8D. The bitmap pattern is also commonly referred to as a basic image pattern.

Basically, the first basic mask image 2450, the second basic mask image 2460, the reverse basic mask image 2461, the third basic mask image 2470 each have a 8×8 basic pixel pattern respectively illustrated in FIGS. 8A, 8B, 8C, and 8D.

The mask image used in the actual semi-transparent processing is made up of multiple vertically-and-horizontally tightly-arranged 8×8 basic pixel patterns, as illustrated in FIG. 8, so as to be the same size as the background image 2410 (so as to have a number of pixels equal to all the pixels of the background image. Since the total number of pixels of the background image is substantially greater than the 8×8 basic pixel pattern (for example, several tens of thousands of pixels and so on), it is difficult to visually recognize the basic pixel pattern without use of magnification.

Here, in FIG. 8, a black square indicates a pixel having a pixel value of '1' (opacity), whereas the white square indicates a pixel having a pixel value of '0' (transparence). The portions with a pixel value of '1' are drawn due to non-existence of masking (colored portions) whereas the portions with a pixel value of '0' are not drawn since there is due to existence of masking (portions without color).

Figure 8A:
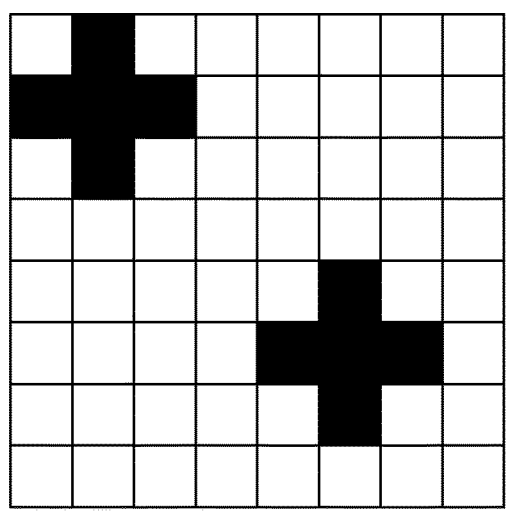
FIG. 8A is a diagram illustrating a bitmap pattern of a first basic mask image according to the embodiment of the present disclosure.

The first basic mask image 2450 is an image having a predetermined opacity degree. Here, for ease of understanding, the first basic mask image 2450 has an opacity degree of 10/64 as illustrated in FIG. 8A. Although FIG. 8A is a bitmap pattern, since the first basic mask image 2450 is a repeating pattern of this bitmap pattern, the opacity degree is 10/64.

Figure 8B:
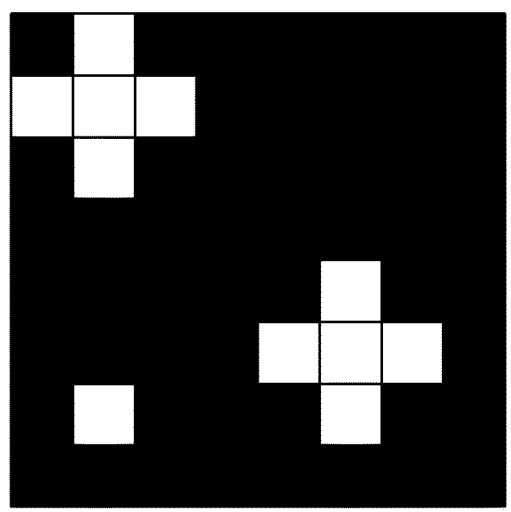
FIG. 8B is a diagram illustrating a bitmap pattern of a second basic mask image according to the embodiment of the present disclosure.
Figure 8C:
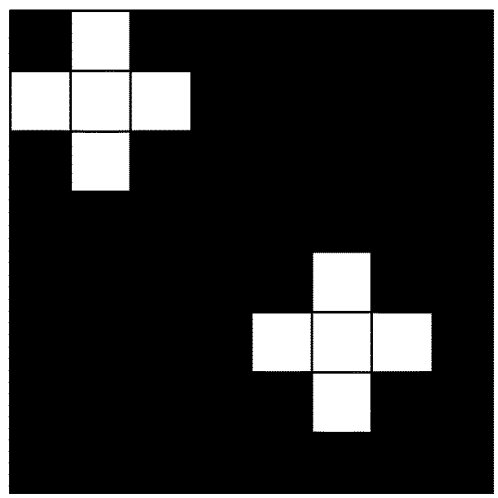
FIG. 8C is a diagram illustrating a bitmap pattern of a reverse basic mask image according to the embodiment of the present disclosure.
Figure 8D:
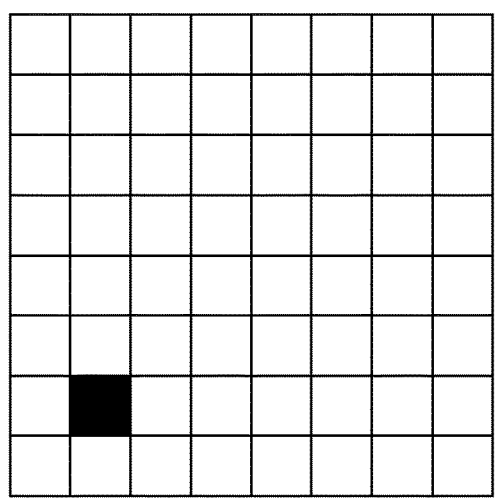
FIG. 8D is a diagram illustrating a bitmap pattern of a third basic mask image according to the embodiment of the present disclosure.

Also, the reverse basic mask image 2461 is an image in which the pixel values '1' and '0' of the first basic mask image 2450 are reversed, as illustrated in FIG. 8C. Therefore, if the opacity degree of the first basic mask image 2450 is A (%), then the opacity degree of the reverse basic mask image 2461 is 100−A (%) opacity degree.

In the second basic mask image 2460, as illustrated in FIG. 8B, the pixels with a pixel value of '0' are in the same position as the pixels with a pixel value of '1' of the first basic mask image 2450. A portion of the pixels in the image that are in the same positions as the pixels with a pixel value of '0' in the first basic mask image 2450 have a pixel value of '0' but besides this exception, the rest of the pixels have a value of '1'. In other words, the second basic mask image 2460 is an image in which the portions of the first basic mask image 2450 with a pixel value of '1' are reversed to '0'.

The pixels of both the first basic mask image 2450 and the second basic mask image 2460 that both have a pixel value of '1' have a pixel value of '0' in the third basic mask image 2470. Also, the pixels of the first basic mask image 2450 and the second basic mask image 2460 that both have a pixel value of '0' instead have a pixel value of '1' in the third basic mask image 2470. In other words, the third basic mask image 2470 is an image in which NOR operation of the first basic mask image 2450 and the second basic mask image 2460 has been performed.

The first basic mask image 2450, the second basic mask image 2460, the third basic mask image 2470, and the reverse basic mask image 2461 are hereinafter collectively referred to as a basic mask image when the individual images need not be distinguished from each other.

Referring back to FIG. 2, the acquirer 250 acquires an image from the storage 240 and outputs the acquired image to the image generator 220.

The acquirer 250 also acquires an image generated by the image generator 220 and stores the acquired image in the storage 240.

The setter 210 performs settings based on the user operations received by the inputter 10. Specifically, the setter 210 sets a relative position between one of the images stored by the storage 240 and the other image based on the user operation received by the inputter 10. The relative positions between the background image 2410 and first image 2410, the second image 2420, the third image 2440, and the fourth image 2445 are predetermined and such information is stored in the storage 240, but this is not limiting. For example, if the acquirer 250 acquires the above-described image from the storage 240 and provides the acquired image to the image generator 220, the setter 210 may set the above-described relative positions based on the user operations received by the inputter 10.

Also, the setter 210 sets a new basic mask image and stores the set basic mask image in the storage 240 based on the user operations received by the inputter 10.

The image generator 220 generates an image based an image to be treated and the basic mask image acquired by the acquirer 250 from the storage 240. The image generator 220 displays the generated image on the display 30. The image generator 220 also stores the generated image in the storage 240 via the acquirer 250.

The image generator 220 performs various types of treatment processing on the images to be treated and then generates a new image.

In the present embodiment, the image generator 220 in particular generates an image in which one image is composited with the other image. Specifically, the image generator 220 generates, as a composited image, an image that has pixel values calculated based on the pixel values of pixels of one image and the pixel values of pixels of the other image that is in the same position as the one image.

The image generator 220 also generates an image in which the one image is overwritten onto the other image. Specifically, the image generator 220 replaces the pixel value of pixels of the other image that is in the same position as the one image with the pixel value of pixels of the one image and generates an overwritten image.

Furthermore, the image generator 220 performs semi-transparent processing using a basic mage image on a foreground image (the first image through the fourth image) to composite the background image 2410.

Image processing is described in detail below.

The first through fifth image generation processing performed by the image generator 220 is described sequentially below.

(First Image Generation Processing)

First image generation processing performed by the image processing device 100 is described below with reference to FIG. 9.

The first image generation processing is processing in which the same basic mask image is used for compositing two foreground images onto the background image. The first image generation processing begins when the user instructs execution of the first image generation processing.

The user selects an image to be used for generating an image (for example, the background image 2410 and a foreground image to be composited onto the background image 2410) via the inputter 10, and then instructs execution of the first image generation processing.

Image selection is performed, for example, via the image selection screen displayed on the display 30. Hereinafter, for ease of understanding, the descriptions below presupposes that the user selected the background image 2410 illustrated in FIG. 3A as the background image and specified the first image illustrated in FIG. 3B and the second image illustrated in FIG. 3C as the foreground images.

In step S101, in response to the instruction to execute the first image generation processing, the acquirer 250 acquires the background image 2410 and the first image 2420 specified by the user from the storage 240. In response to the instruction to execute the first image generation processing, the acquirer 250 also acquires one basic mask image among a plurality of images stored in the storage 240. In this example, the first basic mask image 2450 illustrated in FIG. 8A is acquired.

Figure 10:
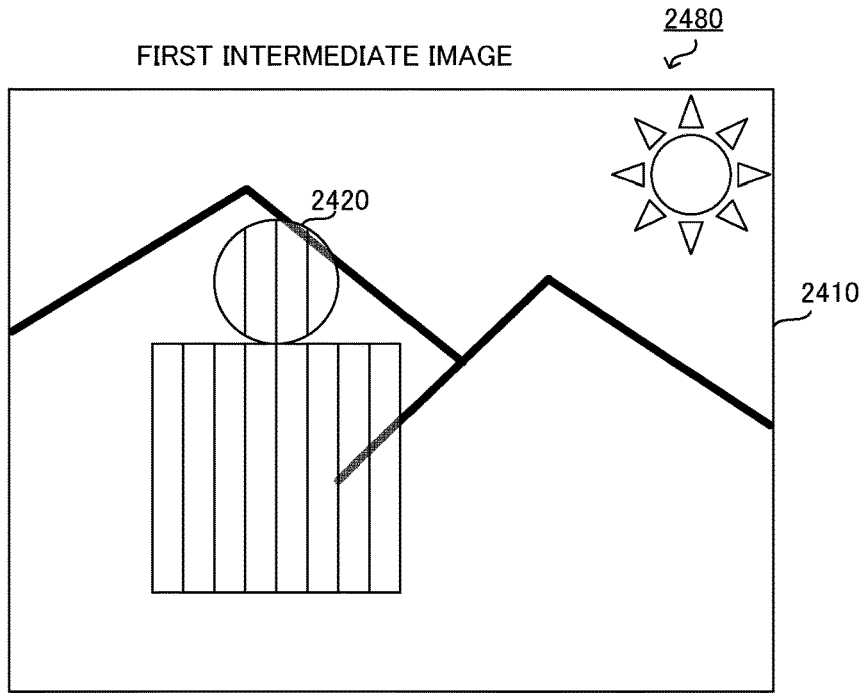
FIG. 10 is a diagram illustrating a first intermediate image according to the embodiment of the present disclosure.

In step S102, the image generator 220 masks the first image 2420 with the first basic mask image 2450 and then overwrites the background image 2410. In doing so, a first intermediate image 2480 illustrated in FIG. 10 is generated.

More specifically, the image generator 220:

(1) generates the first basic mask image 2450 by repeatedly arranging the bitmap pattern of the first basic mask image;

(2) adjusts the position of the first basic mask image 2450 generated with the background image 2410 and the first image 2420; and (3) performs processing to overwrite the pixel values of the pixels in the first image 2420 onto the pixels corresponding to background image 2410, in the pixels that are in the same position as the pixels in the first basic mask image 2450 having a pixel value of '1'. Through this processing, the color of the first image 2420 is applied to the pixels corresponding to the pixel value '1' of the background image 2410. At such time, overwriting onto the background image 2410 is not performed for the pixels of the first image 2420 that are in the same position as the pixels in the first basic mask image 2450 having a pixel value of '0'. Through this processing, the color of the first image 2420 is not applied to the pixels corresponding to the pixel value '0' of the background image 2410.

Through this processing, the first intermediate image 2480 illustrated in FIG. 10 is generated. The intermediate image 2480 is an image that is positioned where the semi-transparent first image 2420 is positioned in front of the background image 2410.

Next, in step S103, the acquirer 250 acquires the second image 2430 from the storage 240.

Figure 11:
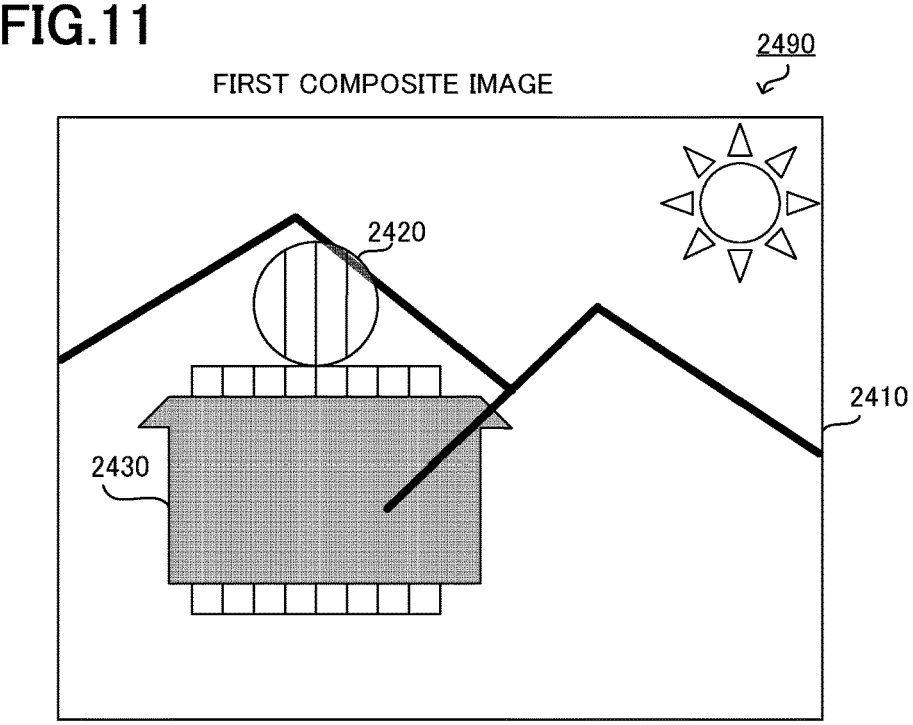
FIG. 11 is a diagram illustrating a first composite image according to the embodiment of the present disclosure.

In step S104, the image generator 220 masks the second image 2430 with the first basic mask image 2450 and then overwrites the first intermediate image 2480. By doing so, the image 2490 illustrated in FIG. 11 is generated as a first composite image and then the generated image 2490 is displayed on the display 30. The masking and overwriting processing is the same as that of the processing in (1) to (3) of step S102.

After completion of step S104, the image generator 220 ends the first image generation processing.

By focusing on the final appearance, it can be said that the first composite image 2490 of FIG. 11 which was generated via the first image generation processing, is an image satisfying (i) and (ii) described below.

The first composite image 2490 is an image in which (i) the second image 2430 is composited onto the background image 2410 in the pixels that are in the same positions as the pixels in the first basic mask image 2450 having a pixel value of '1'. The first composite image 2490 is also an image in which (ii) the first image 2420 is composited at the pixels that are in the same positions as the pixels in the first basic mask image 2450 having a value of '1' where the second image 2430 is not composited. Provided that the first composite image 2490, which satisfies both (i) and (ii), is attained, relying on the first image generation processing in FIG. 9 is not essential. In other words, the first composite image 2490, which satisfies the above-described (i) and (ii), may be generated by another kind of generation processing.

In the first image generation processing, when there are two foreground images (body and clothing) with respect to the background image 2410, masking is performed 2 using the same basic mask image (the first basic mask image 2450 in the first image generation processing, for example). Based on this technical idea, since clothing is overwritten onto body in the areas where the clothing overlaps with the body, the body does not show through. Also, the body and the clothing may be set as semi-transparent by changing the opacity degree of the basic mask image. This enables simple and quick generation of a composite image in which the first image 2420 and the second image 2430 appear semi-transparent with respect to the background image 2410 and the first image 2420 (body of a person) does not show through.

As depicted in FIG. 11, the first image 2420 is an image of a body of a person, the second image 2430 is an image of clothing of the person, and the body cannot be seen through the clothing in the image 2490.

In step S102, the image generator 220 may mask and composite the first image 2420 with the first basic mask image 2450. Specifically, processing in which "compositing in pixels" is performed instead of "overwriting on the pixels" may be performed in the above-described (3) of step S102. Even for images generated in this manner, the first image 2420 in the same position as the second image 2430 is not visible.

(Second Image Generation Processing)

Figure 12:
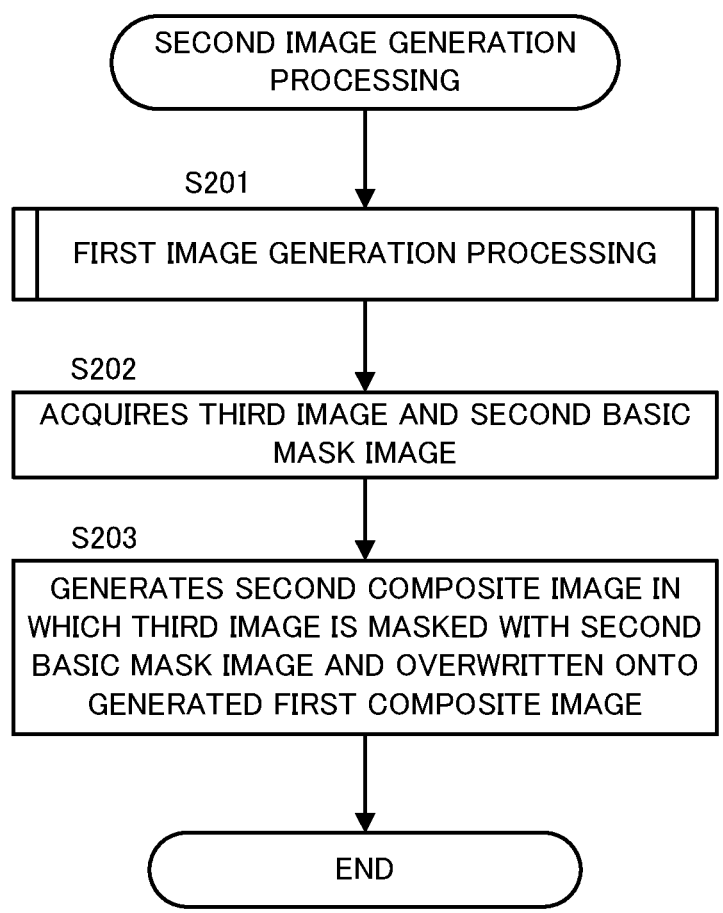
FIG. 12 is a flowchart illustrating a flow of second image generation processing according to the embodiment of the present disclosure.

Next, second image generation processing performed by the image processing device 100 is described with reference to FIG. 12.

This second image generation processing is different in that in addition the first image generation processing, a third image is used as a foreground image and the second basic mask image is used as a basic mask image. The start timing of the second image generation processing is the same as that of the first image generation processing.

In step S201, the image generator 220 generates the image 2490 as the first composite image by performing processing the same as the first image generation processing.

In step S202, the acquirer 250 acquires the third image 2440 and the second basic mask image 2460 from the storage 240.

Figure 13:
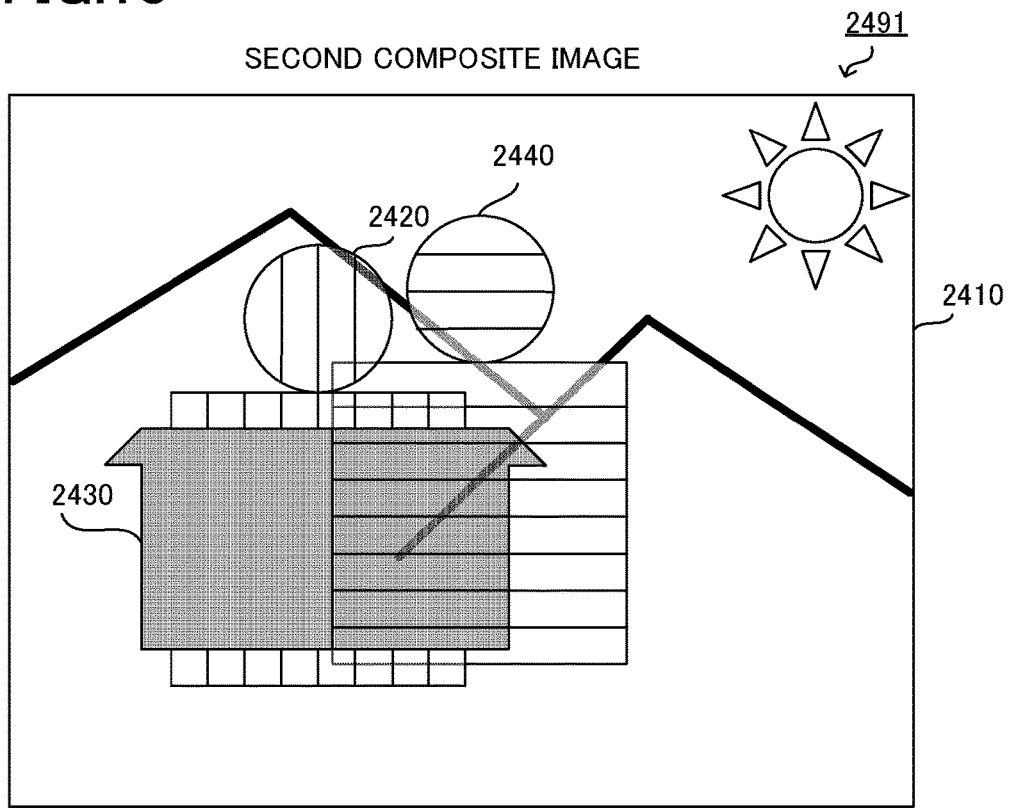
FIG. 13 is a diagram illustrating a second composite image according to the embodiment of the present disclosure.

In step S203, the image generator 220 masks and overwrites the third image 2440 onto the first composite image 2490 with the second basic mask image 2460. By doing so, an image 2491 illustrated in FIG. 13 is generated as the second composite image and then the generated image 2491 is displayed on the display 30. The masking and overwriting processing is the same as that of the processing in (1) to (3) of step S102.

After completion of step S204, the image generator 220 ends the second image generation processing.

(Third Image Generation Processing)

Figure 14:
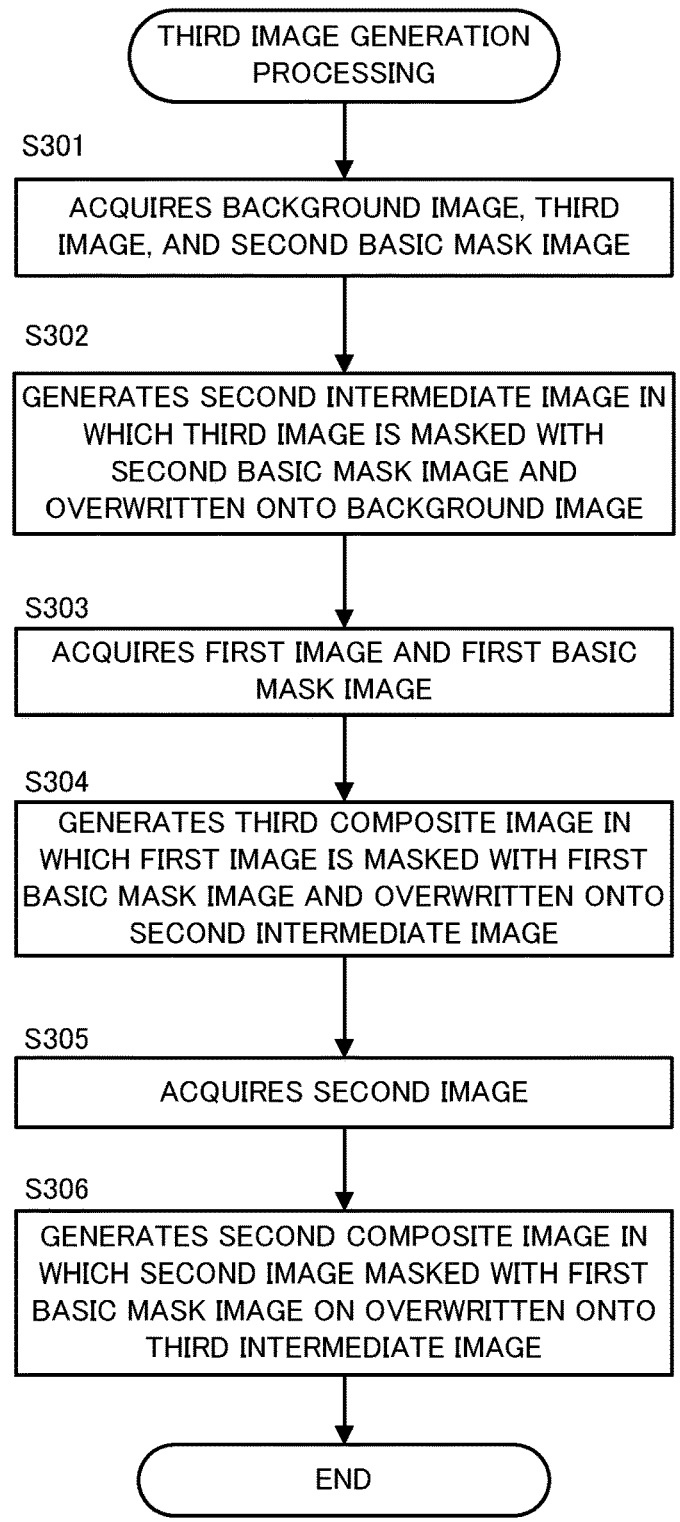
FIG. 14 is a flowchart illustrating a flow of third image generation processing according to the embodiment of the present disclosure.

Next, third image generation processing performed by the image generator 220 is described with reference to FIG. 14. The sequence for generating the image 2491 illustrated in FIG. 13 in the third image generation processing is different from that of the second image generation processing. The start timing of the third image generation processing is the same as that of the first image generation processing.

In step S301, in response to the instruction to execute the third image generation processing, the acquirer 250 acquires the background image 2410 and the third image 2440 specified by the user from the storage 240.

In response to the instruction to execute the third image generation processing, the acquirer 250 also acquires one basic mask image among the plurality of images stored in the storage 240. In this example, the second basic mask image 2460 illustrated in FIG. 8B is acquired.

In step S302, the image generator 220 overwrites the third image 2440 onto the background image 2410 by masking with the second basic mask image 2460. In doing so, a second intermediate image (not illustrated) is generated. The masking and overwriting processing is the same as that of the processing in (1) to (3) of step S102.

In step S303, the acquirer 250 acquires the first image 2420 and the first basic mask image 2450 from the storage 240.

In step S304, the image generator 220 overwrites first image 2420 onto the second intermediate image generated in step S302 by masking with the first basic mask image 2450. In doing so, a third intermediate image (not illustrated) is generated. The masking and overwriting processing is the same as that of the processing in (1) to (3) of step S102.

In step S305, the acquirer 250 acquires the second image 2430 from the storage 240.

In step S306, the image generator 220 overwrites the second image 2430 onto the third intermediate image generated in step S304 by masking with the first basic mask image 2450. By doing so, the image 2491 illustrated in FIG. 13 is generated as the second composite image and then the generated image 2491 is displayed on the display 30. The masking and overwriting processing is the same as that of the processing in (1) to (3) of step S102.

After completion of step S306, the image generator 220 ends the third image generation processing.

(Fourth Image Generation Processing)

Figure 15:
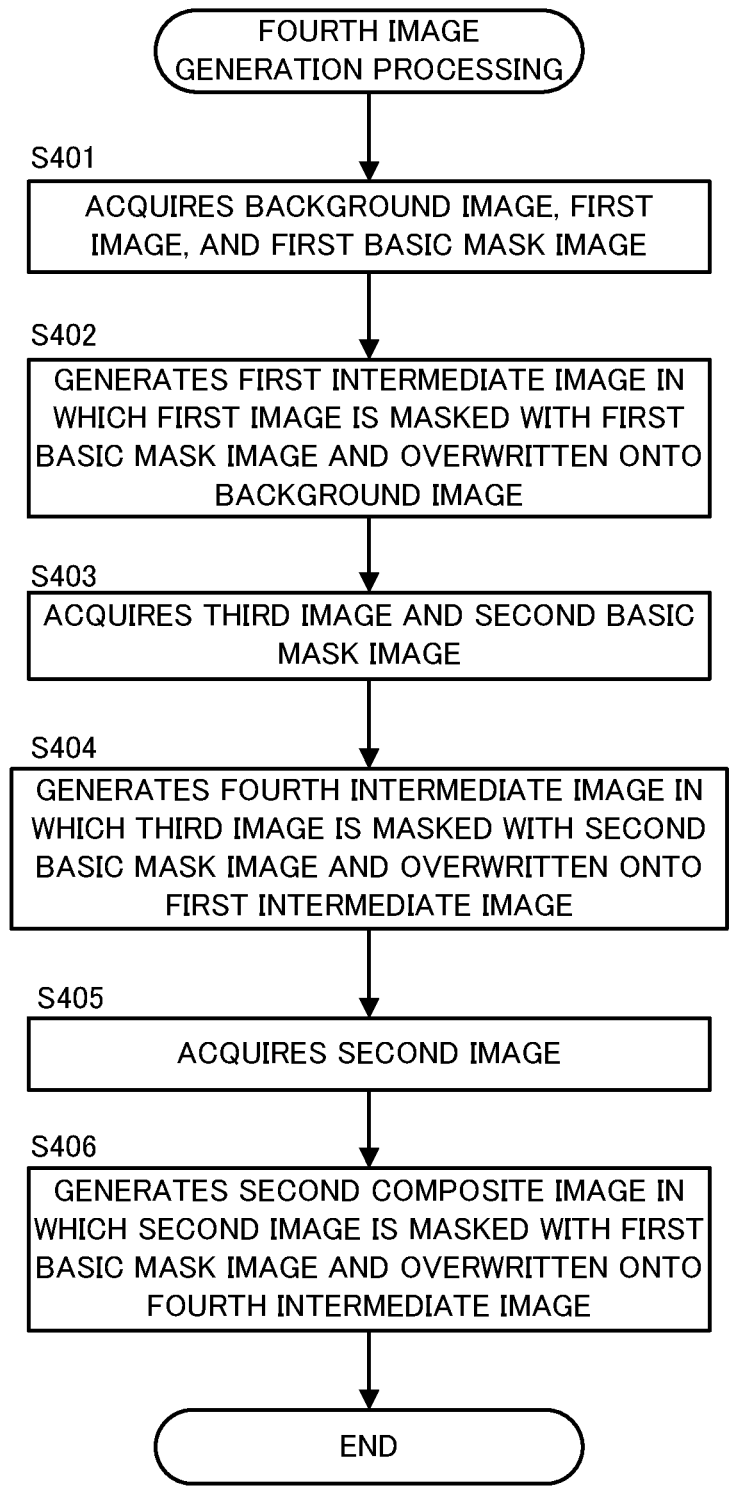
FIG. 15 is a flowchart illustrating a flow of fourth image generation processing according to the embodiment of the present disclosure.

Next, fourth image generation processing performed by the image generator 220 is described with reference to FIG. 15. The sequence for generating the image 2491 illustrated in FIG. 13 in the fourth image generation processing is different from that of the second image generation processing and the third image generation processing. The start timing of the fourth image generation processing is the same as that of the first image generation processing.

The processing in steps S401 and S402 is the same as the processing in steps S101 and S102 of the first image generation processing illustrated in FIG. 9, respectively.

In step S403, the acquirer 250 acquires the third image 2440 and the second basic mask image 2460 from the storage 240.

In step S404, the image generator 220 overwrites the third image 2440 onto the first intermediate image 2480 generated in step S402 by masking with the second basic mask image 2460. In doing so, a fourth intermediate image (not illustrated) is generated. The masking and overwriting processing is the same as that of the processing in (1) to (3) of step S102.

In step S405, the acquirer 250 acquires the second image 2430 from the storage 240.

In step S406, the image generator 220 overwrites the second image 2430 onto the fourth intermediate image generated in the steps S404 by masking with the first basic mask image 2450. By doing so, the image 2491 illustrated in FIG. 13 is generated as the second composite image and then the generated image 2491 is displayed on the display 30. The masking and overwriting processing is the same as that of the processing in (1) to (3) of step S102.

After completion of step S406, the image generator 220 ends the fourth image generation processing.

The image 2491 in FIG. 13 generated by the second image generation processing through the fourth image generation processing is an image in which the third image 2440 is composited only in the pixels that are in the same positions as the pixels in the second basic mask image 2460 having the pixel value of '1'. Also, the pixels that are in the same positions as the pixels in the second basic mask image 2460 having the pixel value of '1', in the first basic mask image 2450 instead have the pixel value of '0'. Therefore, in the image 2491, the third image 2440 overlaps with the first image 2420 and the second image 2430 without any change of color, for example.

In other words, even when crossfading the foreground images of two people, the portions of the basic mask images (the first basic mask image 2450 and the second basic mask image 2460, for example, in the present embodiment) having the pixel value of '1' that mask each of the foreground images do not overlap. Therefore the foreground image of the two people may be set as semi-transparent by changing the opacity degree without experiencing any discoloration and so on.

As depicted in FIG. 13, the first image 2420 is an image of a body of the first person. The second image 2430 is an image of clothing of the first person. The third image 2440 is an image of a second person. Also, the second person crossfades with the first person.

In step S201, step S304, and step S402, the image generator 220 may composite the first image 2420 by masking with the first basic mask image 2450. Also, in step S203, step S302, and step S404, the image generator 220 may composite the third image 2440 by masking with the second basic mask image 2460. Specifically, processing in which "compositing in pixels" is performed instead of "overwriting on the pixels" may be performed in the above-described (3) of step S102. Even for images generated in this manner, the first image 2420 in the same position as the second image 2430 is not visible.

Also, as for the second basic mask image 2460 utilized in the second image generation processing through the fourth image generation processing, the pixels that are in the same positions as the pixels of the first basic mask image 2450 having the pixel value of '0' do not necessarily have a pixel value of '1'. In other words, there is an area other than the two cross-shaped areas (areas with a pixel value of '0') in FIG. 8B that has a pixel value of '0'. Due to this, at the portions of the first image 2420, the second image 2430, and the third image 2440 where there is overlapping, the outer edges of the mountains in the background image 2410, as illustrated in FIG. 13, show through.

Also, in the second image generation processing through the fourth image generation processing, the reverse basic mask image 2461 may be used instead of the second basic mask image 2460. Specifically, the acquirer 250 acquires the reverse basic mask image 2461 instead of the second basic mask image 2460. Then, the image generator 220 masks the third image 2440 with the reverse basic mask image 2461 and then composites the masked third image 2440 with the image 2490. Also, the image 2492 illustrated in FIG. 16 may be generated as the second composite image.

Unlike the second basic mask image 2460, the pixels of the reverse basic mask image 2461 that are in the same positions as the pixels of the first basic mask image 2450 having the pixel value of '0' have a pixel value of '1'. In other words, the reverse basic mask image 2461 is a mask image in which the '1' and '0' of the first basic mask image 2450 are reversed. Due to this, at the portions of the first image 2420, the second image 2430, and the third image 2440 where there is overlapping, the outer edges of the mountains in the background image 2410, as illustrated in FIG. 16, do not show through.

Figure 16:
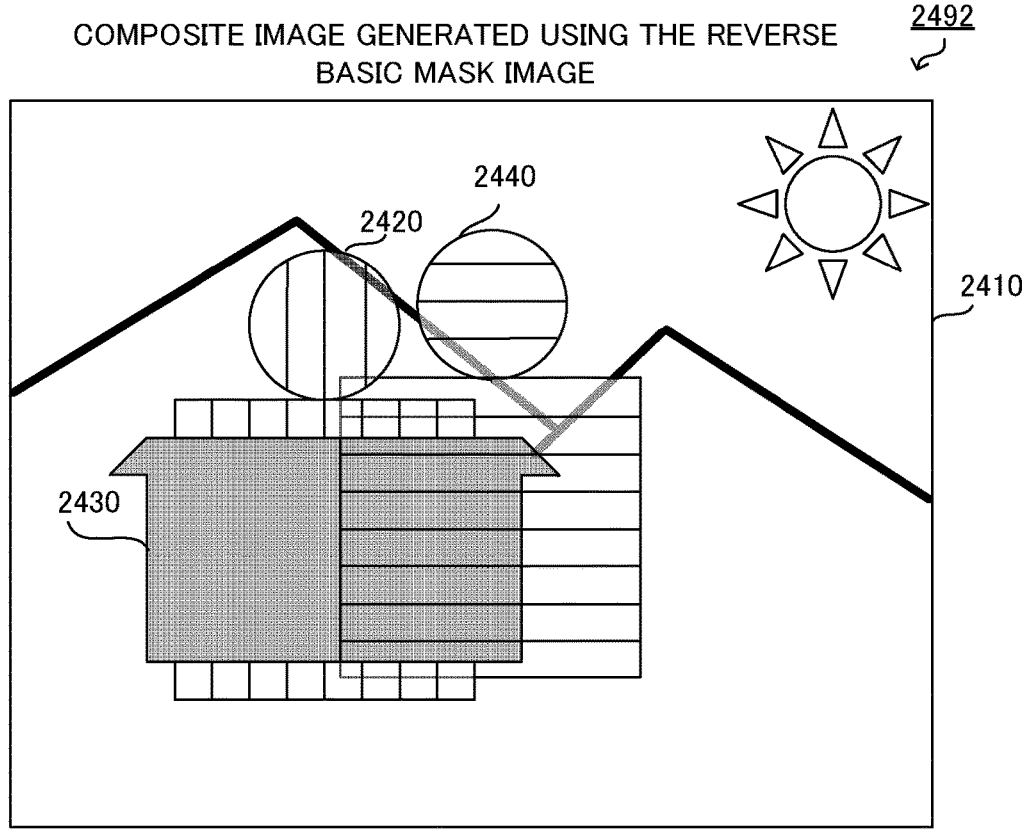
FIG. 16 is a diagram illustrating a composite image generated using the reverse basic mask image in the second through fourth image generation processing according to the embodiment of the present disclosure.

As such, as soon as one person (the person composed of the first image 2420 and the second image 2430 in FIG. 16) fades out and the other person (the person composed of the third image 2440 in the example depicted in FIG. 16) fades in, the outer edges of the mountains in the background image 2410 cannot be seen. Therefore, there is no sense of unnaturalness from the viewpoint of the user.

Also, the use of the reverse basic mask image 2461 avoids overlapping of the first image 2420 and the second image 2430 (body and clothing) with the third image 2440 (body). The usage also enables for the generation of simple and high-speed crossfaded composite images having an inverted opacity degree of the opacity degree of the first basic mask image 2450 (for example, a 40% opacity degree when the first basic mask image 2450 has an opacity degree of 60%).

Also, in the second image generation processing through the fourth image generation processing, any basic mask image set as desired based on the user operation may be used instead of the second basic mask image 2460. Also, pixels of the set basic mask image that are in the same positions as the pixels in the first basic mask image 2450 having a pixel value of '1' do not necessarily have a pixel value of '0'. In other words, the portions of the set basic mask image and the first basic mask image 2450 that have a pixel value of '1' may overlap. As for the pixels having a pixel value of '1' in the overlapping portions of the two basic mask image, one of the foreground images (the first image 2420, for example) is overlapped by another foreground image (the third image 2440, for example). However, the user may set the basic mask images that the user desires to see so that the overlapping does not appear unnatural.

Specifically, instead of acquiring the second basic mask image 2460, the acquirer 250 acquires the basic mask image set based on the user operation as the second basic mask image. The acquirer 250 also outputs the acquired second basic mask image to the image generator 220. The image generator 220 may also generate an image in which the third image 2440 is masked by the acquired second basic mask image and then composited to the image 2490. In doing so, while confirming the image in which the third image 2440 is masked by the second basic mask image and composited to the image 2490, the user may set the second basic mask image so that an image desired by the user is generated.

Also, for the second image generation processing through the fourth image generation processing, the sequence of the processing is different when the image 2491 illustrated in FIG. 13 is generated. In the present embodiment the pixels in the second basic mask image that are in the same positions as the pixels in the first basic mask image having pixel value of '1' have a pixel value of '0'. Therefore, the pixels of the first image and the third image which are foreground images used in the second image generation processing through the fourth image generation processing do not overlap when they are composited. Therefore, the image 2491 illustrated in FIG. 13 may be generated the same way regardless of the sequence of the processing.

In the second image generation processing through the fourth image generation processing, although the premise is that third image and the second basic mask image are one image this is not limiting. For example, the storage 240 may pre-store a number of different third images and a number of different second basic mask images. In such a case, in the second image generation processing through the fourth image generation processing, for example, the acquirer 250 may acquire the desired third image and the desired second basic mask image one at a time from the storage 240. Then, the image generator 220 may utilize these to perform composition processing.

Alternatively, the acquirer 250 acquires two or more of the desired third images and the desired second basic mask images from the storage 240. Then the image generator 220 may utilize these to perform composition two or more times. In such a case, as long as the portions of the two or more basic mask images having a pixel value of '1', acquired by the acquirer 250, do not overlap with each other, there is no change of color in the third images to be composited, for example, where there is overlapping, even when composition processing is performed two or more times. This enables a plurality of different people to be faded in.

(Fifth Image Generation Processing)

Figure 17:
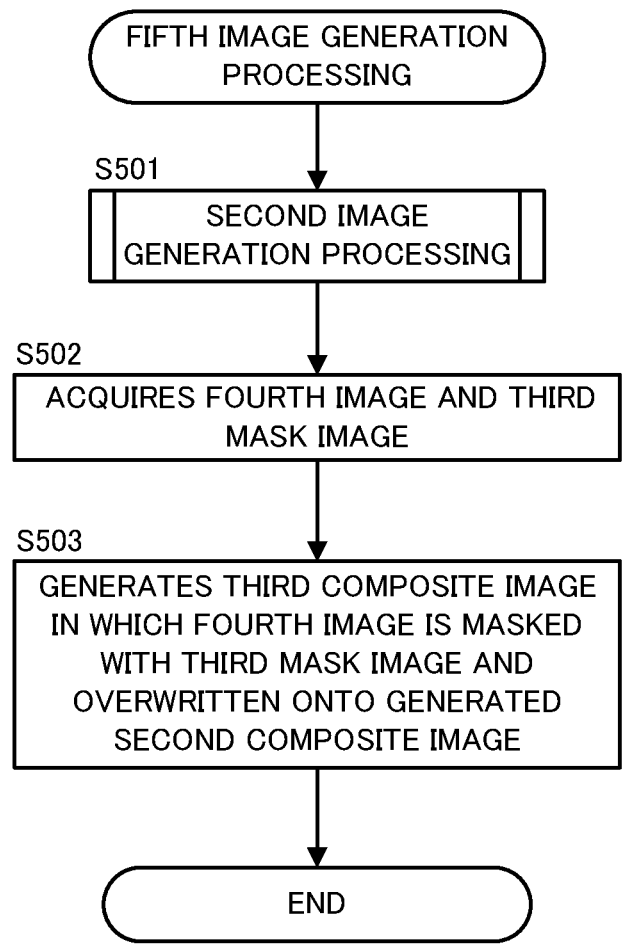
FIG. 17 is a flowchart illustrating a flow of fifth image generation processing according to the embodiment of the present disclosure.

Next, fifth image generation processing is described with reference to FIG. 17. The fifth image generation processing is different in that in addition to the first image generation processing through the fourth image generation processing, the fourth image 2445 is used as a foreground image and the third basic mask image 2470 is used as a basic mask image. The start timing of the fifth image generation processing is the same as that of the first image generation processing.

In step S501, the image generator 220 performs processing the same as the second image generation processing. By doing so, the image 2491 is generated as the second composite image.

In step S502, the acquirer 250 acquires the fourth image 2445 and the third basic mask image 2460 from the storage 240.

Figure 18:
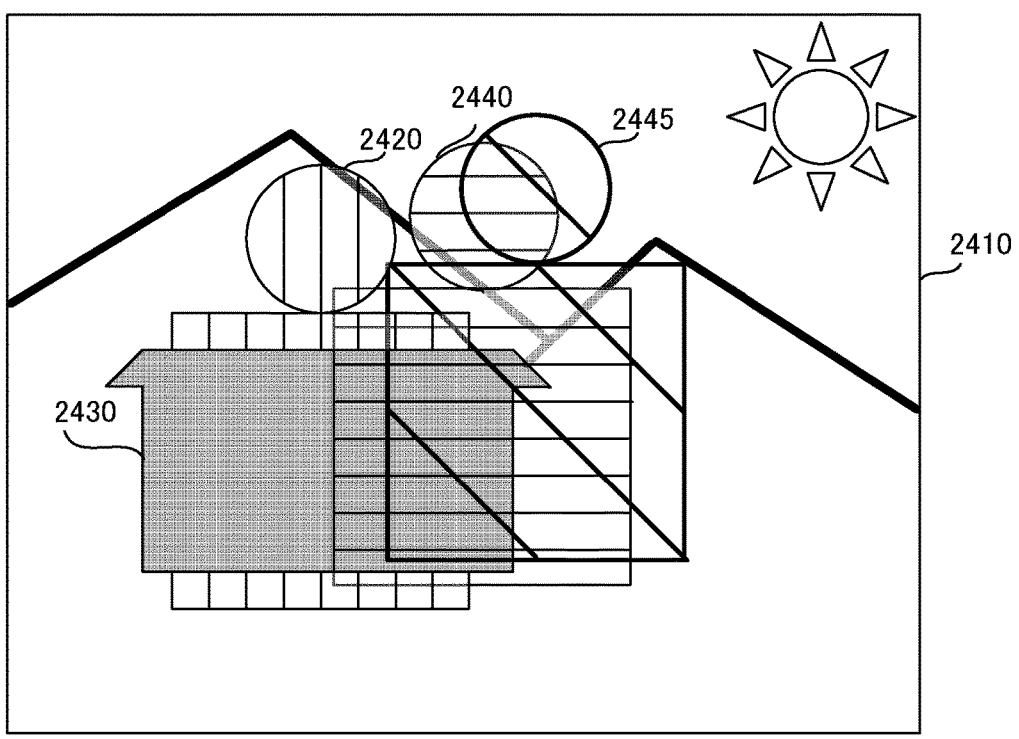
FIG. 18 is a diagram illustrating a third composite image according to the embodiment of the present disclosure.

In step S503, the image generator 220 masks the fourth image 2445 with the third basic mask image 2460 and then overwrites the second composite image 2491. By doing so, the image 2493 illustrated in FIG. 18 is generated as a third composite image and then the generated image 2493 is displayed on the display 30. The masking and overwriting processing is the same as that of the processing in (1) to (3) of step S102.

After completion of step S503, the image generator 220 ends the fifth image generation processing.

The image 2493 generated in the fifth image generation processing is an image in which the fourth image 2445 is composited only in the pixels that are in the same positions as the pixels in the third basic mask image 2470 having the pixel value of '1'.

Therefore, in the image 2493, the fourth image 2445 is only composited in pixels of the third basic mask image 2470 having the pixel value of '1'. Therefore, the fourth image 2445 appears semi-transparent with respect to the background image 2410 in accordance with the opacity degree third basic mask image 2470. Also, the pixels in the third basic mask image 2470 that are in the same positions as the pixels in the first and the second basic mask image 2450 having a pixel value of '1' have a pixel value of '0'. Therefore, in the image 2493, the fourth image 2445 that overlaps with the first image 2420, the second image 2430, and third image 2440 without any change of color, for example.

Furthermore, the pixels in the third basic mask image 2470 that are in the same positions as the pixels in the first basic mask image 2450 having the pixel value of '0' and that are in the same positions as the pixels in the second basic mask image 2460 having the pixel value of '0' have a pixel value of '1'. Due to this, at the portions of the first image 2420, the second image 2430, the third image 2440, and the fourth image 2445 where there is overlapping, the outer edges of the mountains in the background image 2410, as illustrated in FIG. 18, do not show through.

As illustrated in FIG. 18, the first image 2420 is an image of a body of a first person. The second image 2430 is an image of clothing of the first person. The third image 2440 is an image of a second person. The fourth image 2445 is an image of a third person. In the image 2493, the first person, the second person, and the third person are crossfade with each other.

In step S501, the image generator 220 may perform compositing by masking the first image 2420 with the first basic mask image 2450. The image generator 220 may also perform compositing by masking the third image 2440 with the second basic mask image 2460. The image generator 220 may also perform compositing in step S503 by masking the fourth image 2445 with the third basic mask image 2470. Specifically, processing in which "compositing in pixels" is performed instead of "overwriting on the pixels" may be performed in the above-described (3) of step S102. Even for images generated in this manner, the first image 2420 in the same position as the second image 2430 is not visible.

In the second image generation processing through the fifth image generation processing, the third image 2440 of a body of a person and the fourth image 2445 of a body of a person are described as not having clothing, but this is not limiting. For example, an image of clothing may overlap with the third image 2440 and another image of clothing may overlap with the fourth image 2445.

In such a case, a method similar to using the first basic mask image 2450 two times in the first image generation processing can be used. In other words, the third image 2440 and the clothing that overlaps with the third image 2440 are masked two times with the second basic mask image 2460. Furthermore, the fourth image and the clothing that overlaps with the fourth image 2445 are also masked two times with the third basic mask image 2470.

That is to say, by masking with the same basic mask image multiple times, the more deeply-positioned image is overwritten by the image in the most front position even when there are multiple images. Therefore, more-deeply positioned images can be made to not show through, multiple images can be made semi-transparent by the opacity degree of the basic mask images, and the multiple images can be composited onto the background image.

Also, in the first image generation processing through the fifth image generation processing, although the image generator 220 masks and overwrites the entire area of the foreground with the basic mask image this is not limiting. For example, the masking and overwriting with the basic mask image may be performed on only a portion of the foreground image. Thus, for example, a portion of the clothing of the second image 2430 may be masked by the first basic mask image 2450 and then the body, which is the first image 2420, may be overwritten. Then, processing other than overwriting (transparent compositing, for example) may be carried out for portions other than that one portion of the clothing.

Also, each basic mask image used in the first image generation processing through the fifth image generation processing (the first basic mask image 2450, the second basic mask image 2460, and the third basic mask image 2470) are generated by arranging each of the corresponding bitmap patterns illustrated in FIG. 8A, FIG. 8B, FIG. 8C, and FIG. 8D. In other words, as long as there is a function to achieve these basic mask images, the basic mask images do not actually need to be generated. For example, the information equivalent to the basic mask images may be dynamically generated by an equation or a special algorithm without generating a basic mask image and then the above-described first image generation processing through the fifth image generation processing may be performed.

Also, the present embodiment describes that the pixel value of '1' indicates opacity and the pixel value of '0' indicates transparence in the mask image, but this is not limiting. In other words, any image value may be used in the mask image as long as the first pixel value indicating opacity (the portion in which the foreground image is not see-through) and the zero pixel value indicating transparence (the portion in which the foreground is see-through) are distinguishable. For example, the pixel value of '1' may indicate transparence and the pixel value of '0' may indicate opacity and any other pixel values may be used.

Also, the above-described embodiment describes that the program for realizing each operation (the setter 210, the image generator 220, the acquirer 250, and the like) for each processing is pre-stored in the ROM 22. However, the program for realizing the functions of each unit may be stored and distributed on a non-transitory computer-readable recording medium such as a flexible disc, compact disc read-only memory (CD-ROM), digital versatile disc (DVD), magneto optical (MO) disc and/or the like. In addition, by installing the program on a computer such as a PC, a device that executes the above-described functions of each unit may be realized.

Furthermore, the program may be stored on a disk device and/or the like of a server device on the Internet. Also, the program may also, for example, be downloaded to a computer and/or the like.

The foregoing describes an embodiment and modified example for explanatory purposes. Although the foregoing discussion has presented a specific embodiment and modified example, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

(Supplemental Note 1)

An image processing device, including:

storage means for storing a background image, a first image and a second image that are foreground images with respect to the background image and have predetermined positions relative to the background image, and a first mask image formed from pixels having a first pixel value indicating opacity and pixels having a zero pixel value indicating transparence;

acquisition means for acquiring the background image, the first image, the second image, and the first mask image from the storage means; and image generation means for generating a first composite image in which the second image acquired by the acquisition means is composited, onto the background image acquired by the acquisition means, in the pixels that are in the same positions as the pixels in the first mask image having the first pixel value, and the first image acquired by the acquisition means is composited, onto the background image acquired by the acquisition means, where the second image is not composited, in the pixels that are in the same positions as the pixels in the first mask image having the first pixel value.

(Supplemental Note 2)

The image processing device according to claim 1, wherein the image generation means generates a first intermediate image in which the first image is composited onto the background image, only in pixels that are in the same positions as the pixels in the first mask image having the first pixel value, and then generates the first composite image by overwriting the second image onto the first intermediate image, only in pixels that are in the same positions as the pixels in the first mask image having the first pixel value.

(Supplemental Note 3)

The image processing device according to claim 1 or 2, wherein the storage means stores a third image that is a foreground image with respect to the background image and has a predetermined position relative to the background image, and stores a second mask image formed from pixels having the first pixel value indicating opacity and pixels having the zero pixel value indicating transparence, wherein the pixels that are in the same positions as the pixels in the first mask image having the first pixel value have the zero pixel value, the acquisition means acquires the third image and the second mask image from the storage means, and the image generation means generates a second composite image by compositing the third image onto the first composite image in pixels that are in the same positions as the pixels in the second mask image having the first pixel value.

(Supplemental Note 4)

The image processing device according to claim 3, wherein the pixels in the second mask image that are in the same position as the pixels in the first mask image having the zero pixel value have a first pixel value.

(Supplemental Note 5)

The image processing device according to claim 3, wherein the storage means stores a fourth image with respect to the background image and has a predetermined position relative to the background image, and stores a third mask image formed from pixels having the first pixel value indicating opacity and pixels having the zero pixel value indicating transparence, wherein the pixels that are also in the same positions as the pixels in the second mask image having the first pixel value have the zero pixel value, the acquisition means acquires the fourth image and the third mask image from the storage means, and the image generation means generates a third composite image by compositing the fourth image onto the second composite image in pixels that are in the same positions as the pixels in the third mask image having the first pixel value.

(Supplemental Note 6)

The image processing device according to claim 5, wherein the pixels in the third mask image that are in the same positions as the pixels in the first mask image having the zero pixel value and that are in the same positions as the pixels in the second mask image having the zero pixel value have the first pixel value.

(Supplemental Note 7)

The image processing device according to claim 1 or 2, further including:

setting means for setting, in the storage means, a second mask image formed from pixels having the first pixel value indicating opacity and pixels having the zero pixel value indicating transparence, based on a user operation, wherein the storage means stores a third image that has a predetermined positions relative to the background image, and the second mask image set by the setting means, the acquisition means acquires the third image and the second mask image from the storage means, and the image generation means generates a second composite image by compositing the third image onto the first composite image in pixels that are in the same positions as the pixels in the second mask image having the first pixel value.

(Supplemental Note 8)

The image processing device according to any one of claims 1 to 7, wherein
the first pixel value is '1' and the zero pixel value is '0'.

(Supplemental Note 9)

An image processing method, comprising:
storing a background image, a first image and a second image that are foreground images with respect to the background image and have predetermined positions relative to the background image, and a first mask image formed from pixels having a first pixel value indicating opacity and pixels having a zero pixel value indicating transparence;
acquiring the background image, the first image, the second image, and the first mask image that are stored; and
generating a first composite image in which the second image is composited, onto the background image acquired, in the pixels that are in the same positions as the pixels in the first mask image having the first pixel value, and the first image is composited, onto the background image acquired, where the second image is not composited, in the pixels that are in the same positions as the pixels in the first mask image having the first pixel value.

(Supplemental Note 10)

A program configured to cause a computer to function as:
storage means for storing a background image, a first image and a second image that are foreground images with respect to the background image and have predetermined positions relative to the background image, and a first mask image formed from pixels having a first pixel value indicating opacity and pixels having a zero pixel value indicating transparence;
acquisition means for acquiring the background image, the first image, the second image, and the first mask image from the storage means; and
image generation means for generating a first composite image in which the second image acquired by the acquisition means is composited, onto the background image acquired by the acquisition means, in the pixels that are in the same positions as the pixels in the first mask image having the first pixel value, and the first image acquired by the acquisition means is composited, onto the background image acquired by the acquisition means, where the second image is not composited, in the pixels that are in the same positions as the pixels in the first mask image having the first pixel value.

This application claims the benefit of Japanese Patent Application No. 2014-055087, filed on Mar. 18, 2014, including the specification, claims, drawings, and abstract, the entire disclosure of which is incorporated herein by reference.

REFERENCE SIGNS LIST

10 Inputter
21 CPU
22 ROM
23 RAM
24 HDD
25 I/O port
30 Display
100 Image processing device
210 Setter
220 Image generator
240 Storage
250 Acquirer
2410 Background image
2420 First image
2430 Second image
2440 Third image
2445 Fourth image
2446 Image indicating the relative position between the background image and the first image
2447 Image indicating the relative position between the background image and the second image
2448 Image indicating the relative position between the background image and the third image
2449 Image indicating the relative position between the background image and the fourth image
2450 First basic mask image
2460 Second basic mask image
2461 Reverse basic mask image
2470 Third basic mask image
2480 First intermediate image
2490 First composite image
2491 Second composite image
2492 Composite image generated using the reverse basic mask image
2493 Third composite image

The invention claimed is:

1. An image compositing device based on a mask image, comprising:
a processor; and
a memory storing a non-transitory computer executable program for directing the processor to achieve the following operations:
storing a background image, a first image and a second image that are foreground images with respect to the background image and have predetermined positions relative to the background image, and a first mask image for generating a semi-transparent image, wherein the first mask image is formed from pixels having a first pixel value indicating opacity and pixels having a zero-th pixel value indicating transparence;
acquiring the stored background image, the stored first image, the stored second image, and the stored first mask image; and
generating a first composite image by generating a first intermediate image in which the acquired first image is composited onto the acquired background image, only in pixels that are in the same positions as the pixels in the acquired first mask image having the first pixel value, and then overwriting the acquired second image onto the first intermediate image, only in pixels that are in the same positions as the pixels in the acquired first mask image having the first pixel value.

2. The image processing device according to claim 1, wherein
the storing step further comprises storing a third image that is a foreground image with respect to the background image and has a predetermined position relative to the background image, and storing a second mask image formed from pixels having the first pixel value indicating opacity and pixels having the zero-th pixel value indicating transparence, wherein the pixels that are in the same positions as the pixels in the first mask image having the first pixel value have the zero-th pixel value,
the acquiring step further comprises acquiring the stored third image and the stored second mask image, and
the image generating step further comprises generating a second composite image by compositing the third image onto the first composite image in pixels that are in the same positions as the pixels in the second mask image having the first pixel value.

3. The image processing device according to claim 2, wherein
the pixels in the second mask image that are in the same position as the pixels in the first mask image having the zero-th pixel value have the first pixel value.

4. The image processing device according to claim 2, wherein
the storing step further comprises storing a fourth image with respect to the background image and has a predetermined position relative to the background image, and storing a third mask image formed from pixels having the first pixel value indicating opacity and pixels having the zero-th pixel value indicating transparence, wherein the pixels that are also in the same positions as the pixels in the second mask image having the first pixel value have the zero-th pixel value,
the acquiring step further comprises acquiring the stored fourth image and the stored third mask image, and
the image generating step further comprises generating a third composite image by compositing the fourth image onto the second composite image in pixels that are in the same positions as the pixels in the third mask image having the first pixel value.

5. The image processing device according to claim 4, wherein
the pixels in the third mask image that are in the same positions as the pixels in the first mask image having the zero-th pixel value and that are in the same positions as the pixels in the second mask image having the zero-th pixel value have the first pixel value.

6. The image processing device according to claim 1 wherein the processor is directed by the non-transitory computer executable program stored in the memory
to set a second mask image formed from pixels having the first pixel value indicating opacity and pixels having the zero-th pixel value indicating transparence, based on a user operation,
to store a third image that has predetermined positions relative to the background image, and the set second mask image,
to acquire the stored third image and the stored second mask image, and
to generate a second composite image by compositing the third image onto the first composite image in pixels that are in the same positions as the pixels in the second mask image having the first pixel value.

7. The image processing device according to claim 1, wherein
the first pixel value is '1' and the zero-th pixel value is '0'.

8. An image compositing method based on a mask image and implemented by a processor, comprising:
storing a background image, a first image and a second image that are foreground images with respect to the background image and have predetermined positions relative to the background image, and a first mask image for generating a semi-transparent image, wherein the first mask image is formed from pixels having a first pixel value indicating opacity and pixels having a zero-th pixel value indicating transparence;
acquiring the stored background image, the stored first image, the stored second image, and the stored first mask image; and
generating a first composite image by generating a first intermediate image in which the acquired first image is composited onto the acquired background image, only in pixels that are in the same positions as the pixels in the acquired first mask image having the first pixel value, and then overwriting the acquired second image onto the first intermediate image, only in pixels that are in the same positions as the pixels in the acquired first mask image having the first pixel value.

9. A non-transitory computer-readable recording medium storing a program configured to:
store a background image, a first image and a second image that are foreground images with respect to the background image and have predetermined positions relative to the background image, and a first mask image for generating a semi-transparent image, wherein the first mask image is formed from pixels having a first pixel value indicating opacity and pixels having a zero-th pixel value indicating transparence;
acquire the stored background image, the stored first image, the stored second image, and the stored first mask image; and
generate a first composite image by generating a first intermediate image in which the acquired first image is composited onto the acquired background image, only in pixels that are in the same positions as the pixels in the acquired first mask image having the first pixel value, and then overwriting the acquired second image onto the first intermediate image, only in pixels that are in the same positions as the pixels in the acquired first mask image having the first pixel value.

10. The image compositing device based on a mask image according to claim 1, wherein the first mask image includes tightly-arranged basic pixel patterns.

* * * * *